Oct. 11, 1955
B. E. HOUSE ET AL
2,720,287
BRAKE ASSEMBLY
Filed June 1, 1953
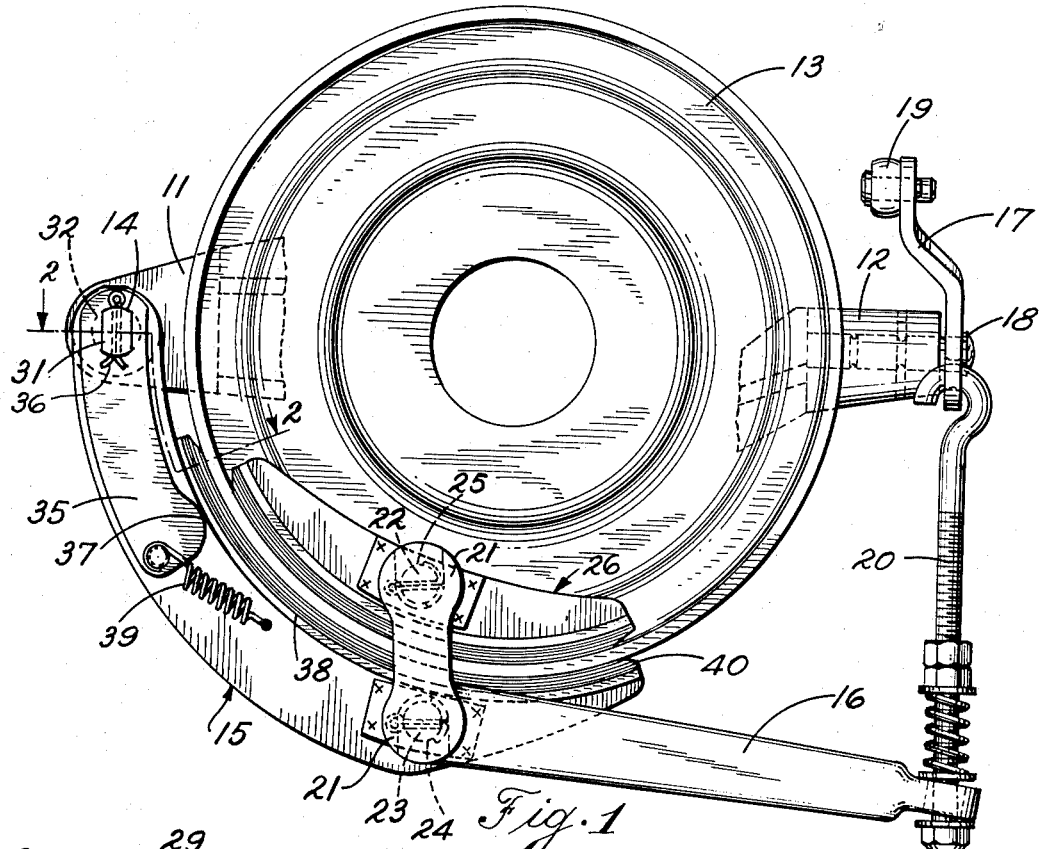
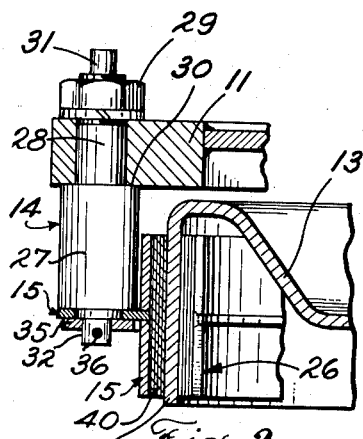
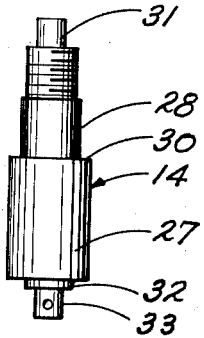
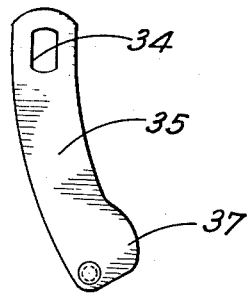
INVENTORS
BRYAN E. HOUSE
& RALPH K. SUPER
BY
RICHEY, WATTS, EDGERTON & M<sup>c</sup>NENNY
A.H. Edgerton.
ATTORNEYS

2,720,287
Patented Oct. 11, 1955

2,720,287
BRAKE ASSEMBLY

Bryan E. House and Ralph K. Super, Ashtabula, Ohio, assignors to Detroit Duo-Grip Brake Corporation, Detroit, Mich., a corporation of Michigan Application June 1, 1953, Serial No. 358,746

5 Claims. (Cl. 188—74)

This invention relates broadly to brakes and more specifically to improvements in the structure of the brake shoe supporting structure.

The object of the invention resides in the provision of an anchor post for the pendulous support of a brake shoe and the adjustable retention of an arm constituting a stop to delimit the movement of the shoe.

Other objects and advantages more or less ancillary to the foregoing, and the manner in which all the various objects are realized will appear in the following description, which, considered in connection with the accompanying drawing, sets forth the preferred embodiment of the invention.

Referring to the drawing:

Fig. 1 is a side elevational view of a brake assembly illustrating the improved anchor post with the stop arm and brake shoe in place thereon;

Fig. 2 is a vertical sectional view through the post and supporting arm therefor, the section being taken on a plane indicated by the line 2—2 in Fig. 1;

Fig. 3 is a detail side elevational view of the arm; and

Fig. 4 is a detail side elevational view of the post.

Referring first to Fig. 1, the brake assembly comprises generally a journal bearing block mounted on the frame of a vehicle, not shown, a pair of arms 11 and 12 disposed in opposed relation to each other in a plane common to the horizontal axis of the bearing, and a brake drum 13 mounted for rotation with the drive shaft journaled in the bearing. The arm 11 is drilled for the reception of an anchor post 14 constituting the fulcrum for an outer brake shoe 15, while the arm 12 is machined to provide a pivotal support for the brake control linkage and operating lever 16. The linkage comprises a bell crank 17 mounted on a pin 18 in the arm 12, a pull rod 19 pivotally coupled therewith, and a link 20 pendulously supported thereon to facilitate the pivotal movement of the lever 16. The lever is formed with a vertically disposed arm 21 on the inner end thereof which is provided with a pair of spaced pintles 22 and 23 disposed, respectively, for engagement in an opening 24 in the ribbed portion of the outer brake shoe 15 and an opening 25 in the rib of an inner brake shoe 26. The pintle 22 forms the fulcrum for the lever 16; hence, as the outer end thereof is elevated as occurs when the pull rod 19 is retracted during the application of the brakes, the pintle 22 will rotate within its seat and draw the shoes 15 and 26 toward each other into impinged relation with the flanged portion of the brake drum 13.

The anchor post 14 as shown in Fig. 4 comprises a cylindrical body 27 formed with a shank 28 for engagement in the drilled opening in the arm 11. The outer end of the shank is threaded to receive a nut 29 for drawing the shoulder 30 of the post into impinged relation with the face of the arm. The free end of the shank is milled with lands 31 thereon to accommodate the use of a wrench while rotatively adjusting the post. The opposed end of the post is machined to form a diametrically reduced bearing 32 for the pivotal support of the brake shoe 15, and the adjacent end thereof is milled with lands 33 for engagement with a rectilinear opening 34 in an arm or stop 35 which is mounted thereon in depending relation thereto. The arm supporting pin or bearing 32 is cross-drilled to receive a cotter pin 36 for the retention of the arm 35. The lower end of the arm is provided with an arcuate lobe 37 designed for engagement with the flanged portion 38 of the brake shoe 15, and a contractile spring 39 is mounted on the arm and anchored in the shoe to urge the shoe outwardly and thus maintain a clearance between the brake drum 13 and the friction material or lining 40.

As the brake shoe lining wears, the anchor post nut 29 may be released and the post and stop then rotated until the desired clearance between the drum and lining is attained. Thereafter the nut may be retightened to clamp the post in fixed relation to the arm 11.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. Mechanism for regulating the clearance between a brake drum and a pivotally supported brake shoe comprising a fixed arm, a post mounted for rotatable adjustment thereon, a nut on said post for clamping the post in affixed adjusted relation on said arm, a journal bearing on said post, a brake shoe mounted for pivotal movement on said bearing, rectangular lands on said post adjacent said bearing, a stop arm having a rectangular opening in one end thereof engaged with the lands on said post, and a spring connected to said stop arm and to said brake shoe for drawing the shoe into abutting engagement with said stop arm.

2. In a brake assembly embodying a rotative brake drum, a fixed anchor arm, and a pivotally supported brake shoe mechanism for maintaining the brake shoe in spaced relation with the drum comprising a post mounted for rotative adjustment in said anchor arm and constituting the fulcrum for said brake shoe, a depending stop affixed on said post, a spring carried by said stop and connected to said shoe drawing the shoe into abutting engagement with the stop, and clamping means on said post for the retention thereof in adjusted position.

3. In a brake assembly embodying a rotative brake drum, a fixed anchor arm, and a pivotally supported brake shoe mechanism for maintaining the brake shoe in spaced relation with the drum comprising a post mounted on said arm and constituting the fulcrum for said brake shoe, a friction wear lining on said shoe, a stop affixed upon said post, a spring connected to said stop and said brake shoe urging the shoe into abutting engagement with the stop and a clamping mechanism on said post to support the stop in adjusted position in compensation of the wear of the brake lining on the shoe.

4. Mechanism for regulating the clearance between a brake drum and a pivotally supported brake shoe comprising a fixed arm, an anchor post, mounted for rotational adjustment thereon, means for clamping said post against rotational movement relative to said arm, a brake shoe pivoted on said post, a stop arm keyed to said post and depending therefrom, and a contractile spring connected to said stop arm and to said shoe, drawing said shoe into abutting engagement with said stop arm.

5. Mechanism for regulating the clearance between the brake shoe and a brake drum in a brake assembly comprising a flanged brake drum, a fixed brake shoe supporting arm protruding beyond the circumferential edge of the brake drum, a post journaled for rotative adjustment in the end of said arm, a brake shoe pivoted on said post, a stop arm affixed upon the outer end of said post, a spring connected to said stop arm and said shoe, drawing the shoe into engagement with the end portion of said stop arm, a threaded shank on said post, and a nut on said shank for clamping the post in adjusted relation to said arm, whereby said post together with said arm may be rotatively adjusted to maintain the brake shoe in spaced relation with the brake drum flange.

References Cited in the file of this patent

UNITED STATES PATENTS

| | | |
|---|---|---|
| 2,015,704 | Bittner | Oct. 1, 1935 |
| 2,236,776 | Ludwig | Apr. 1, 1941 |
| 2,398,717 | Owens | Apr. 16, 1946 |
| 2,550,731 | Tack | May 1, 1951 |